United States Patent

Hyland

[11] Patent Number: 6,112,994
[45] Date of Patent: Sep. 5, 2000

[54] CARD READER CONNECTOR WITH ATTACHABLE COVER

[75] Inventor: James Henry Hyland, Hummelstown, Pa.

[73] Assignee: The Whitaker Corporation, Wilmington, Del.

[21] Appl. No.: 08/984,612

[22] Filed: Dec. 3, 1997

Related U.S. Application Data

[60] Provisional application No. 60/039,828, Feb. 27, 1997.

[51] Int. Cl.⁷ .................................................. G06K 7/00
[52] U.S. Cl. ............................ 235/486; 235/441; 439/630
[58] Field of Search ................................ 335/435, 439, 335/441, 482, 486, 492, 449, 483; 361/737; 439/630, 696, 731

[56] References Cited

U.S. PATENT DOCUMENTS

| | | | |
|---|---|---|---|
| 4,859,199 | 8/1989 | Komatsu | 439/267 |
| 4,900,272 | 2/1990 | Lange et al. | 439/630 |
| 4,990,758 | 2/1991 | Shibano et al. | 235/441 X |
| 5,013,255 | 5/1991 | Juret et al. | 439/260 |
| 5,169,345 | 12/1992 | Pernet | 439/630 |
| 5,231,274 | 7/1993 | Reynier et al. | 235/441 |
| 5,257,414 | 10/1993 | Trahan et al. | 235/441 X |
| 5,269,707 | 12/1993 | Reichardt et al. | 439/630 |
| 5,336,877 | 8/1994 | Raab et al. | 235/441 X |
| 5,402,095 | 3/1995 | Janniere | 235/441 |
| 5,520,551 | 5/1996 | Broschard, III | 430/567 |
| 5,653,610 | 8/1997 | Broschard, III | 439/630 |
| 5,667,397 | 9/1997 | Brochard, III et al. | 439/188 |
| 5,667,408 | 9/1997 | Brochard, III et al. | 439/630 |
| 5,718,609 | 2/1998 | Braun et al. | 439/630 |
| 5,813,878 | 9/1998 | Kuwata et al. | 439/326 |
| 5,823,828 | 10/1998 | Bricaud et al. | 439/630 |
| 5,892,210 | 4/1999 | Levasseur | 235/435 X |

FOREIGN PATENT DOCUMENTS

| | | | |
|---|---|---|---|
| 0 336 330 | 10/1989 | European Pat. Off. | H01R 23/68 |
| 0 633 633 | 1/1995 | European Pat. Off. | H01R 23/68 |
| 0 738 983 A1 | 10/1996 | European Pat. Off. | G06K 7/06 |
| 0 756 242 | 1/1997 | European Pat. Off. | G06K 7/06 |

OTHER PUBLICATIONS

PTC Search Report received Jun. 24, 1998: 3 pages.
Abstract and drawings for File No. 16787A, Serial No. 09/116,139 filed Jul. 15, 1998 based on CIP 08/950,115 filed Oct. 14, 1997, and Provisional Application Serial No. 60/028,531 filed Oct. 17, 1996.
Abstract and drawings for File No. 16693, Serial No. 08/935,553 filed Sep. 23, 1997 based on Provisional Application Serial No. 60/027,268 filed Sep. 26, 1996.

*Primary Examiner*—Donald Hajec
*Assistant Examiner*—Jared J. Fureman
*Attorney, Agent, or Firm*—Michael J. Aronoff

[57] ABSTRACT

A card reader connector (10) includes a housing (12) having a base (14) and a cover (40) securable together and defining a card receiving slot (60) extending therebetween. The rear wall (22) and side walls (30) of the base (14) coextend alongside and inwardly of the rear wall (50) and side walls (56) of the cover (40) upon assembly. The cover side walls (56) each include at least one flange (58) extending inwardly, and the base side walls (30) each include flange-receiving openings (32) and flange-receiving slots (34) associated with the flanges (58) and the cover (40) and the base (14) include cooperating locking sections operable after final stages of assembly. During assembly the side wall flanges (58) of the cover (40) are moved into respective flange-receiving slots (34) securing the cover (40) and base (14) from movement directly apart, and the locking sections securing the cover (40) and base (14) from any further relative sliding movement.

4 Claims, 4 Drawing Sheets

CARD READER CONNECTOR WITH ATTACHABLE COVER

This application claims the benefit of U.S. Provisional Application Ser. No. 60/039,828 filed Feb. 27, 1999.

FIELD OF THE INVENTION

This invention is directed to an electrical connector and more particularly to an electrical connector for receiving a planar electronic card module.

BACKGROUND OF THE INVENTION

Electrical connectors for electronic-memory cards, such as smart cards and subscriber identification modules (SIMs), are well know known in the computer and communications industries. These cards contain information that can be used by a card reader or card interface device to detect or read information stored in the card. Cards of this type are used, for example, in automatic teller machines, in security identification, such as smart keys or the like, or other devices. The cards contain an array of circuit pads that are accessible by the card reader connectors. The card reader connectors include a housing having a slot into which the card can be inserted and multiple terminals in the housing that engage the regions on the face of the card as it becomes fully inserted. The connector may further include end position or card detecting switches to assure that the card is fully inserted before reading occurs. The housings generally include a base in which the contacts are disposed and a cover securable to the base to define the card receiving slot.

U.S. Pat. No. 5,013,255 illustrates the use of bosses 109 that engage apertures in the cover in an interference fit. The cover may also be secured to the base by means of adhesives, heat staking, or other methods known in the art. Alternatively, the cover may be pivotable, that is one that is moved into position after the card is inserted. In some instances, however, it is desirable to have a cover that may be readily removed for access to the contact surfaces for repairing, cleaning or the like.

SUMMARY OF THE INVENTION

The present invention is directed to a card reader that alleviates some of the problems associated with the prior art. The card reader includes a plurality of data contacts disposed in a housing including a base and a cover securable together and defining a card receiving slot extending therebetween. The base and the cover include respective rear walls and opposed side walls. The base and cover are adapted such that the rear wall and side walls of the base co-extend along side and inwardly of the rear and side walls of the cover upon assembly. The cover provides a clearance spaced forwardly of the rear wall for receipt thereinto of the rear wall of the base during initial stages of the assembly such that the base is offset forwardly with respect to the cover. Each of the side walls proximate the base includes at least one flange extending inwardly that cooperates with a respective flange-receiving opening on each of the base side walls. The openings extend toward a bottom or cover-remote surface of the base and are in communication with flange-receiving slots extending forwardly therefrom adjacent the bottom surface of the base. The cover and base include cooperating locking sections operable after final stages of assembly. Upon assembling the cover to the base, the side wall flanges of the cover are received in the respective flange-receiving openings of the base side walls during the initial stages of assembly with the base offset forwardly with respect to the cover. The side wall flanges are moved forwardly into and along the flange-receiving slots of the openings until the cover is moved fully forwardly with respect to the base. The side wall flanges secure the cover and base from movement directly apart and the locking sections secure the base and cover from any further relative sliding movement.

In the preferred embodiment of the invention, the rear wall of the base includes a latch-receiving opening extending therethrough adapted to cooperate with a respective latch of the cover during assembly. The cover includes at least one latch at the rear wall, and upon full assembly, the latch proximate the rear wall of the cover becomes engaged in the corresponding latch-receiving opening to prevent rearward movement of the cover on the base. The rear wall of the base in the preferred embodiment further includes boss-receiving recesses on the board proximate surface dimensioned to receive cooperating bosses on the rear wall of the cover thus securing the cover to the base along the rear wall as well as the side walls and preventing upward movement of the cover with respect to the base therealong.

It is an object of the invention to provide a card reader connector having a cover that may be readily removed for access to the contact surfaces for repairing, cleaning or the like.

It is a further object of the invention to provide a card reader connector that is cost effective to manufacture and can be used either with or without a cover, as desired.

It is another object of the invention to provide a cover for a card reader connector that is easy to assemble to a base, requires a minimum amount of board space to assemble to the base, and is held securely to the base.

An embodiment of the invention will now be described by way of example with respect to the following drawings.

DETAILED DESCRIPTION OF THE DRAWINGS

Figure 1:
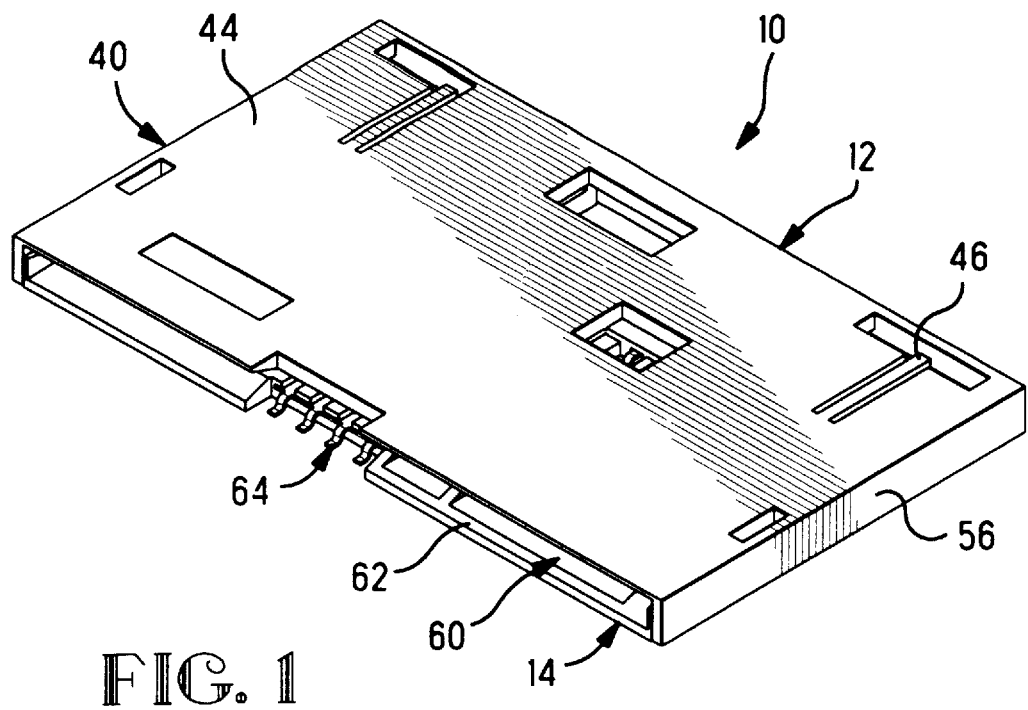
FIG. 1 is an isometric view of the assembled card reader connector made in accordance with the invention.

For purposes of illustration, the card reader connector and housing will be described with reference to a smart card reader. It is to be understood that the housing assembly can be used with other size cards as well, such as SIM cards or the like.

Referring now to FIGS. 1 to 7, card reader connector 10 includes a housing 12 having a base 14 and a cover 40 securable together and defining a card-receiving slot 60 extending therebetween from a mouth 62 at the forward end of the housing 12 to the rear thereof. Base 14 includes an inner surface 16 and a outer surface 18 and a plurality of contact-receiving slots 20 extending therethrough and having respective data contacts 64 disposed therein.

Base 14 includes a rear wall 22 and opposed side walls 30 extending upwardly therefrom. Rear wall 22 further includes at least one latch-receiving aperture 24 that cooperates with a respective latch of the cover 40 during assembly, as more fully explained below. Each side wall 30 includes at least one flange-receiving opening 32 extending therealong toward a cover-remote or bottom surface of the base from the edge thereof and in communication with a flange-receiving slot 34 extending forwardly therefrom adjacent the cover remote surface of the base 14. Outer surface 18 of base 14 includes at least one alignment post 38 for aligning the card reader connector 10 on a circuit board (not shown).

Cover 40 includes an inner surface 42 and an outer surface 44. Extending downwardly from surface 42 are a rear wall 50 and opposed side walls 56. Cover 40 also includes at least one latch arm 46 extending through the cover from and having a respective latch protrusion 48 extending inwardly from inner surface 42 proximate the rear wall 50. Rear wall 50 further includes bosses 52 extending inwardly at the board proximate surface thereof and adapted to engage in respective boss-receiving recesses 26 of the base when the card reader connector 10 is fully assembled. Side walls 56 of the cover 40 include inwardly directed flanges 58 that cooperate with the flange-receiving openings 32 and flange-receiving slot 34.

The base 14 and cover 40 are adapted such that the rear wall 22 and side walls 30 of the base 14 co-extend along side and inwardly of the rear wall 50 and side walls 56 of the cover 40 upon assembly. The cover 40 provides a clearance spaced forwardly of the rear wall 50 for receiving the rear wall 22 of the base 14 during initial stages of assembly such that the base 14 is offset forwardly with respect to the cover 40, such as shown in FIGS. 4 and 5.

Figure 3:
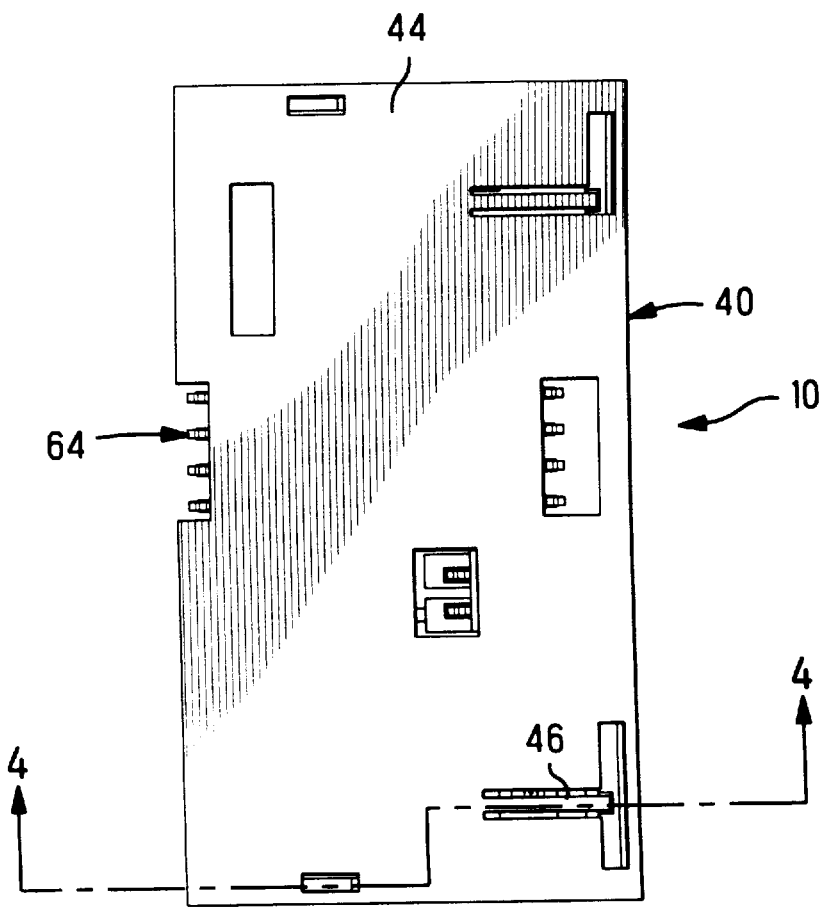
FIG. 3 is a top view of the connector of FIG. 1.
Figure 2:
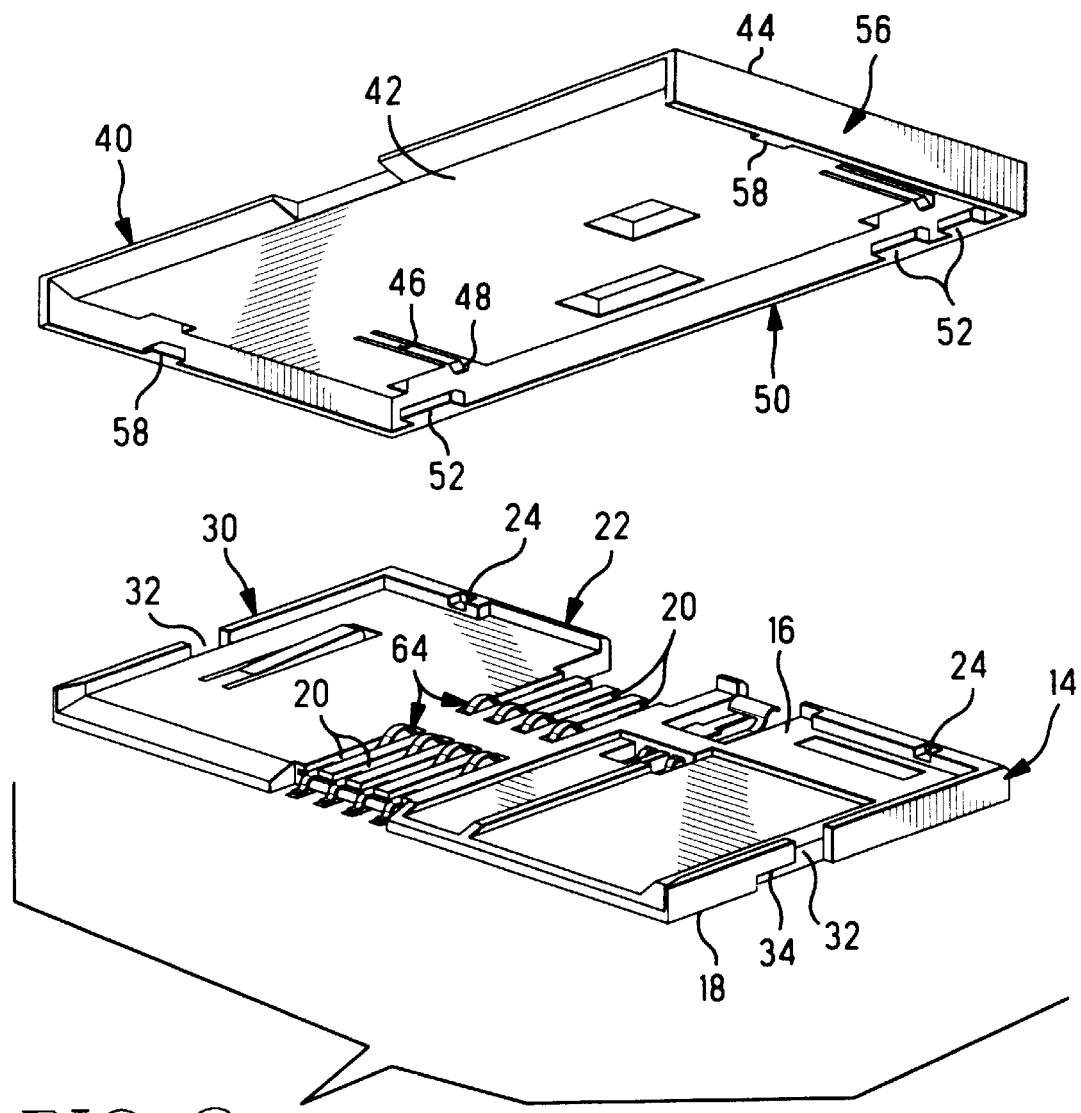
FIG. 2 is an exploded view of the card reader connector of FIG. 1.
Figure 6:
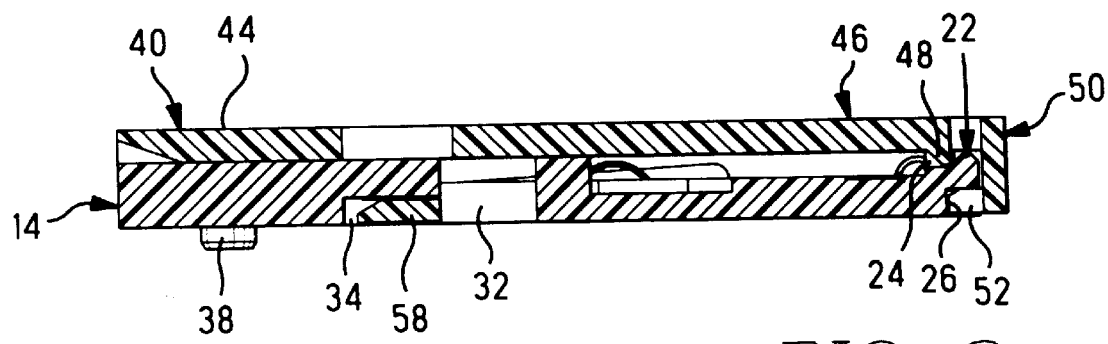
FIG. 6 is a view similar to FIG. 4 showing the base and cover fully assembled.
Figure 4:
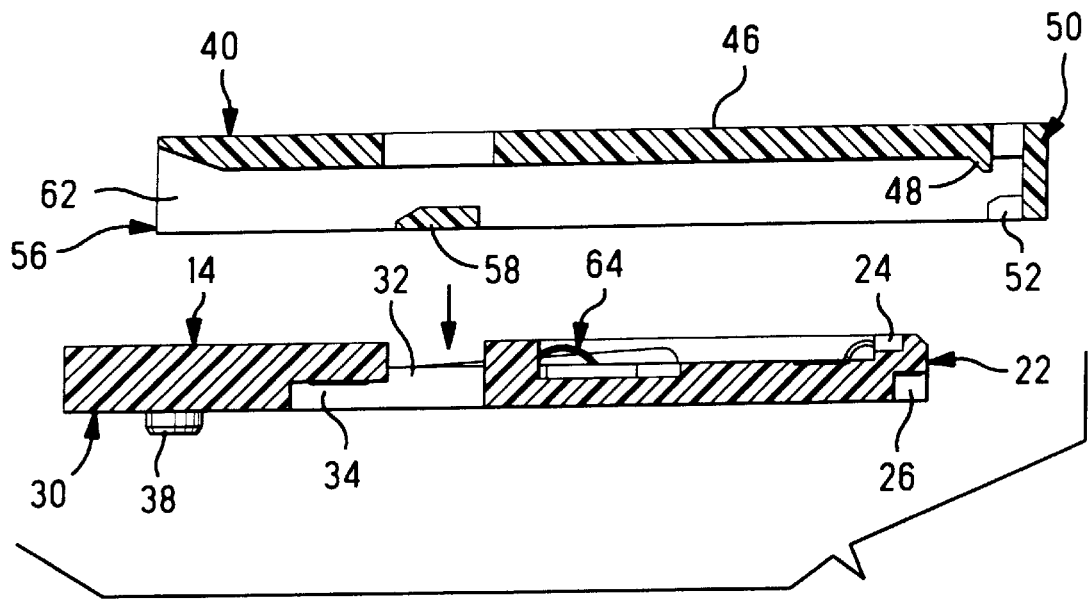
FIG. 4 is a sectional view taken along the line 4—4 of FIG. 3 illustrating the cover and base prior to assembly.
Figure 7:
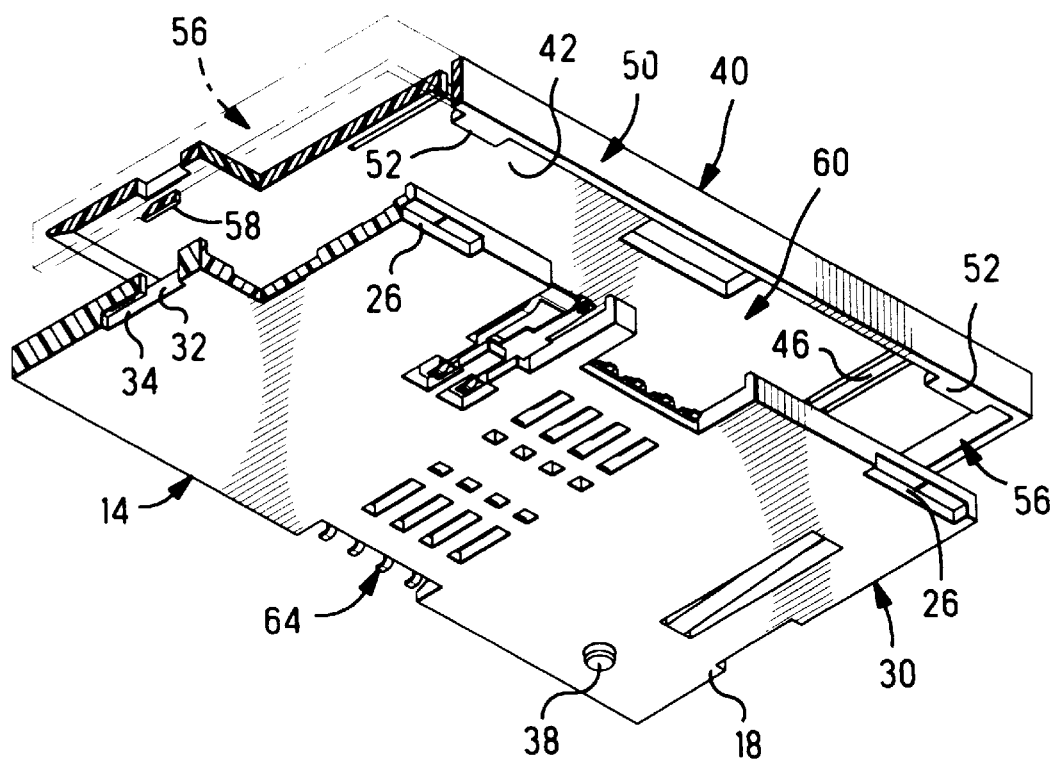
FIG. 7 is an exploded view of the assembly as viewed from the base with a portion of the side wall broken away.
Figure 5:
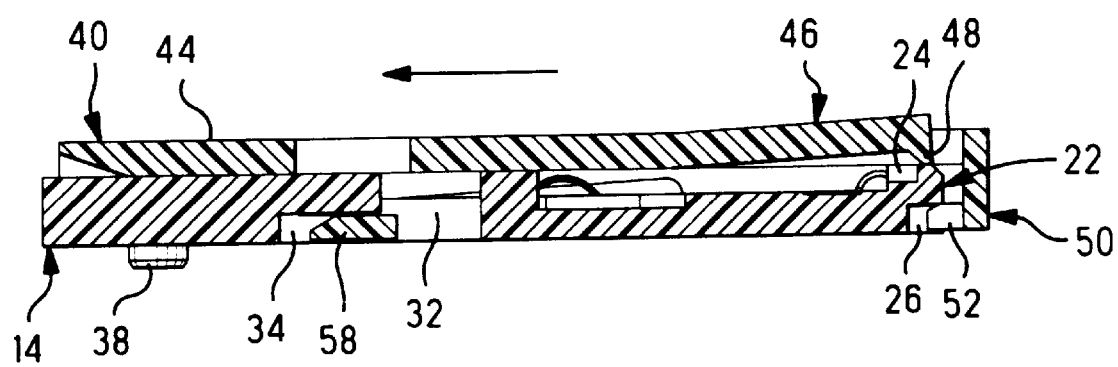
FIG. 5 is a view similar to that of FIG. 4 showing the base and cover partially assembled.

FIGS. 4 through 6 illustrate the assembly of the base 14 and cover 40. FIG. 4 is a cross-sectional view taken along line 4—4 of FIG. 3 illustrating one of the sides of the connector 10 and the cooperating features that secure the housing 12 together. FIG. 4 is an exploded view of the base 14 and cover 40 prior to assembly. FIG. 5 shows the base 14 and cover 40 partially assembled and FIG. 6 shows the fully assembled base 14 and cover 40 forming the card reader connector 10. As can be seen from FIGS. 4 through 6, as the base 14 and cover 40 are brought together, the corresponding flange 58 on cover side wall 56 is received in the corresponding flange-receiving opening 32 in base side wall 30 and is moved downwardly toward the cover remote surface 18 of the base as the cover 40 is moved downwardly toward the base 14, as shown in FIG. 4. During initial stages of assembly, the base 14 is off-set forwardly with respect to the cover 40. The base 14 is received in the clearance of cover 40 with the cover rear wall 50 surrounding base rear wall 22 and the cover side walls 56 surrounding the base side walls 30. The cover requires only a minimum amount of space available on a circuit board (not shown) rearwardly of the base of the connector to effect assembly.

As the cover is moved in the direction indicated by the arrow in FIG. 5, flange 58 is moved along flange-receiving slot 34 until the cover 40 is moved fully forwardly with respect to the base 14. As the cover 40 and base 14 are moved more closely together, the bosses 52 along the base of the rear wall 50 of cover 40 are received in the corresponding boss-receiving recesses 26 of the base 14. Concomitantly the latch arm 46 is deflected upwardly when the leading end of latch protrusion 48 engages the rear wall 22 of base 14. Latch arm 46 remains deflected upwardly until the cover 40 is moved completely forward wherein the latch protrusion 48 is received in latch-receiving aperture 24 and flange 58 is seated in flange-receiving slot 34. As can be seen in the assembled view of FIG. 6, the side wall flanges 58 secure the cover 40 and base 14 from movement directly apart and the locking sections, that is the latching protrusion 48 and the latch-receiving aperture 24, prevent further relative sliding movement.

Additionally the cover 40 and base 14 are held together securely along the rear walls by bosses 52 on the cover that are engaged in respective boss-receiving recesses 26 of base 14 as the cover 40 is moved toward the front of the card reader 10, as shown in FIG. 6.

The present invention provides a card reader connector 10 that has a base and cover that can be secured together after the base has been soldered to the desired location on a circuit board (not shown) thus enabling inspection of the contacts on the circuit board prior to assembly of the cover. The cover, furthermore, can be removed by engaging the respective latch arms 46 and deflecting them upwardly to allow the cover to slide rearwardly until the bosses 52 are removed from the recesses 26 and the corresponding flange 58 are removed from the associated flange-receiving slots 34 and the cover 40 can be lifted directly upwardly from the base 14. The cover 40 can be removed for repairing or cleaning the surfaces of the contacts. The card reader connector is cost effective to manufacture and can be used either with or without a cover, as desired. The cover is easy to assemble to a base, requires a minimum amount of board space to assemble to the base, and is held securely to the base along the rear and side walls.

It is thought that the card reader connector of the present invention and many of its attendant advantages will be understood from the foregoing description. It is apparent that various changes may be made in the form, construction, and arrangement of parts thereof without departing from the spirit or scope of the invention, or sacrificing all of its material advantages.

I claim:

1. A card reader connector including a plurality of data contacts disposed in a housing, said housing comprising:

a base and a removable cover securable together and defining a card receiving slot extending therebetween from a mouth at a forward end of the housing;

said base and cover including respective rear walls and opposed side walls extending from three sides thereof such that said rear wall and side walls of said base coextend alongside and inwardly of said rear wall and side walls of said cover upon assembly;

said cover provides a clearance spaced forwardly of said rear wall thereof and dimensioned for receiving said rear wall of said base thereinto during initial stages of assembly such that said base is offset a short distance forwardly with respect to said cover;

each base-proximate edge of said cover side walls include at least one flange extending inwardly, and each said base side walls include flange-receiving openings associated with said flanges and extending therealong from cover-proximate edges thereof toward a cover-remote surface of said base and in communication with flange-receiving slots extending forwardly therefrom adjacent said cover-remote surface of said base; and said cover and said base include at least one cooperating locking section operable after final stages of assembly;

whereby when said cover is assembled to said base, said rear wall of said base is received in said clearance and said side wall flanges of said cover are received in respective said flange-receiving openings of said base side walls during initial stages of assembly with said base off-set forwardly with respect to said cover, and said side wall flanges are moved forwardly into and along said flange-receiving slots of said flange-receiving openings until said cover is moved fully forwardly with respect to said base, with said side wall flanges securing said cover and base from movement directly apart, and said at least one cooperating locking section securing said cover and base from any further relative sliding movement.

2. The card reader connector of claim 1 wherein said at least one cooperating locking section includes at least one latch-receiving opening extending through said rear wall of said base and adapted to cooperate with a corresponding latch of said cover during assembly, and said cover includes at least one latch along said rear wall, such that upon full assembly, said at least one latch along said rear cover wall becomes engaged in a corresponding one of said at least one latch-receiving opening thereby preventing rearward movement of said cover on said base.

3. The card reader connector of claim 2 further including a second cooperating locking section including at least one boss-receiving opening at the board proximate surface of said rear wall of said base and at least one boss extending inwardly from said rear wall of said cover and associated with a respective boss-receiving opening during assembly, such that upon full assembly, said boss becomes engaged in said boss-receiving opening thereby preventing upward movement of said cover from said base along said rear walls.

4. The card reader connector of claim 1 wherein said at least one cooperating locking section includes at least one boss-receiving opening at the board proximate surface of said rear wall of said base and at least one boss extending inwardly from said rear wall of said cover and associated with a respective boss-receiving opening during assembly, such that upon full assembly, said boss becomes engaged in said boss-receiving opening thereby preventing upward movement of said cover from said base along said rear walls.

* * * * *